Patented June 18, 1940

2,205,042

UNITED STATES PATENT OFFICE 2,205,042

SOFTENING OF TEXTILE MATERIALS AND COMPOSITIONS THEREFOR

Samuel Lenher and Luther B. Arnold, Jr., Wilmington, Del., assignors to E. I. du Pont de Nemours & Company, Wilmington, Del., a corporation of Delaware No Drawing. Application October 26, 1937, Serial No. 171,135

7 Claims. (Cl. 28—1)

This invention relates to the treatment of textiles, more particularly it relates to the softening of filaments, staple fibers, threads, yarns and fabrics composed of synthetic and cellulosic materials. In its preferred embodiment it relates to the softening of artificial cellulosic fibers, such as lustrous and delustered cellulose ethers and esters, regenerated cellulose and the like. The invention also pertains to treating solutions.

It is an object of this invention to treat synthetic and cellulosic fibers so that they will be soft to the touch. It is a further object to prepare soft, smooth, cellulosic fibers which are free from objectionable odor. A still further object is to soften cellulosic fibers in such a manner that their strength will not be impaired. A still further object is to soften synthetic and cellulosic fibers in such a manner that their solubility characteristics are not increased. Other objects will appear hereinafter.

We have found that the condensation products prepared by reacting a higher aliphatic monocarboxylic acid with an alkylolamine are of great value when incorporated in very small amounts in aqueous solutions for softening textile fibers. We have further found that if the just described condensation products are further treated with acids, both of organic and inorganic type that the resulting products are also of great value when incorporated in aqueous solutions in small amounts for softening textiles.

The condensation products may be prepared by reacting the higher fatty acid with the alkylolamine at temperature above about 80° C. and preferably above 100° C. The preferred range is between 150° C. and 220° C. In some cases it might be expedient to accelerate the reaction by adding the usual types of condensating agent such as zinc chloride, concentrated sulfuric acid, etc.

The higher aliphatic acids employed for the condensation may contain 12 or more carbon atoms and are preferably saturated monocarboxylic acids, e. g. palmitic, stearic and arachidic. It is not necessary that the free acids be used, however, alhough they give excellent results. Thus the esters, anhydrides and acid halides may be used. As specific examples of equivalent compounds, mention is made of stearic, palmitic and arachidic anhydrides, chlorides, bromides and iodides, ethyl and methyl stearate, palmitate and arachidates. Mixtures of the above agents may be used.

The said alkylol amines may contain 1, 2 or 3 alkylol groups and 1 or 2 alkyl, cycloalkyl or aryl groups. For example, monoethanol amine, monopropanol amine, diethanolamine, dipropanolamine, butanol amine, triethanolamine, dimethyl ethanolamine, methyl diethanolamine, diethanol butanolamine, cyclohexylethanol amine, ethanolaniline, etc., may be used. The dialkylol amines having a hydrogen atom attached to the nitrogen atom form the preferred embodiment of the invention. In case of the trialkylol amines, a number of complications arise in that an esterification reaction rather than amide condensation is effected. The amides, their esters and ester-amides possess good softening powers when used under the conditions prescribed by this invention. The preferred condensation products are those obtained by reacting a dialkylol amine having at least one hydrogen atom attached to the nitrogen atom, with a higher saturated monocarboxylic acid.

The acids used for the after treatment may be of organic or inorganic type. Thus the condensation products may be reacted with acetic, formic, glycollic, oxalic, etc., acids. Dilute sulfuric and phosphoric acids may be used. The hydrohalic acids, such as hydrochloric, hydrobromic, hydroiodic, acids are particularly useful. In place of the free acids, one may use the easily dissociated metal salts of inorganic acids, such as sulfates or chlorides of magnesium, zinc, aluminum and the like. One may also use the lower alkyl esters of inorganic acids, such as monoethyl sulfate, monomethyl sulfate, ethyl phosphate, dimethyl sulfate, ethyl chloride, benzyl chloride, methyl bromide, ethyl iodide, and the like. These last mentioned compounds apparently hydrolyze under the reaction conditions although in some instances alkylation may also be effected.

As a result of our investigation, we have discovered the surprising and unexpected results that when fibers, yarns, fabrics, etc., either synthetic or cellulosic are treated with aqueous solutions containing very small amounts of the above-mentioned compounds, they are softened to a marked degree. The fibers are not only smooth and soft, but are fuller, more pliable and in general more pleasing to the touch. The small amounts referred to constitute on the order of 0.001 to 0.05% by weight of the aqueous solution. While the condensation products which have not been after treated with acids and equivalent agents are excellent softening agents, particularly for viscose rayon and similar artificial cellulosic materials, we have found that the acid treated products in most instances at least double the softening power. Viscose rayon both of the lustrous and delustered type is very markedly softened by the use of the amounts falling within the lower portion of the range, viz. from 0.001 to 0.01%.

The objects as will be apparent from the preceding description are accomplished by treating filaments, threads, yarns, skeins or fabrics in an aqueous solution at about 20° to about 100° C. containing from 0.001% to 0.05% by weight of the described condensation products and those condensation products which have been after treated with acids.

The invention will be further illustrated but is not to be limited by the following examples:

Example I

Viscose yarn is treated at 50–80° C. in an aqueous solution containing 0.003% by weight of a condensation product of 1.75 mols of diethanolamine and 1 mol of stearic acid. The condensation reaction was effected at about 180° C. for a period of several hours. The time of the treatment of the viscose yarn was about four minutes. The yarn after drying was found to be very soft to the touch, smooth and greatly improved in appearance.

Example II

Viscose yarn is treated at 40–80° C. in an aqueous solution containing 0.003% by weight of the condensation product described in Example I which has been after treated by adding the condensation product to a hot dilute water solution of hydrochloric acid. The time of treatment of the viscose yarn in the solution was about 4 minutes. The yarn after drying was found to be improved in appearance, free from odor and discoloration, smooth and soft to the touch.

Example III

Viscose yarn of the lustrous type which had been dyed with 2% "Pontamine" Fast Blue 3R (C. I. 464) was treated in the manner of Example I with a condensation product of 1.5 mols of diethanolamine and 1 mol of stearic acid which had been after treated by adding glacial acetic acid to the condensation mixture which had been cooled to a temperature slightly below 100° C.

The yarn was found to be very soft to the touch, improved in appearance and free from odor. The shade and light fastness of the dye was found to be unchanged. Other direct dyes can be substituted with similar results, e. g. "Pontamine" Fast Yellow, 4 GL (C. I. 349), "Pontamine" Fast Red, F 6% (C. I. 419), "Pontamine" Bordeaux B 4% (C. I. 375), "Pontamine" Catechu B 4%. Acid dyed materials as well as those dyed with other dyes show similar improvements.

Example IV

Crepe fabrics which are made with a cellulose acetate fiber warp and a viscose fiber filling are treated at 40–75° C. for about 15 minutes with an aqueous solution containing about 0.01% by weight of a condensation product of 1 mol of palmitic acid and 1 mol of diethanolamine which has been after treated with ¾ of a mol of dimethylsulfate. The dimethysulfate was added to the condensation mixture at about room temperature.

The fabric after drying is greatly improved in appearance and soft to the touch.

Example V

Cellulose acetate yarn is treated at 40–60° C. for 5 minutes in an aqueous bath containing 0.02% by weight of a condensation product of 1 mol of a mixture of palmitic, stearic, and arachidic acid with 1 mol of diethanolamine which has been after treated with ¾ of a mol of dilute sulfuric acid at 80° C. After drying the yarn is found to be very soft, free from assuming static charges when handled, of good odor, and free from discoloration.

Example VI

Cellulose acetate staple fibers are treated at 40–60° C. in an aqueous solution containing 0.04% by weight of a condensation product of 1.75 mols of diethanolamine and 1 mol of stearic acid which has been after treated by bubbling hydrochloric acid through the condensation mass cooled to below 100° C. After drying the cellulose acetate staple fibers are found to be greatly improved in appearance and properties and free from developing static charges when passed through the usual operations involved in the preparation of yarn, e. g. lapping, carding or combing, and spinning. The fibers were soft and smooth to the touch and free from odor.

Example VII

Cotton sheeting fabric is treated in the same manner and with the same reagents as the yarn of Example V. The cotton sheeting is found to be improved in appearance and properties and soft to the touch. The white fabric was free from discoloration.

Example VIII

Cotton sheeting fabric which has been dyed with "Pontamine" Fast Yellow 4 G. L. (C. I. 349) is treated with the same solution as described in Example I under similar temperature conditions for five minutes. The sheeting was found to be improved in appearance, soft and smooth to the touch. Its light fastness and shade was unchanged.

In place of the specific condensation products of the preceding examples, any of the arylolamine fatty acid condensation products described above may be substituted. The acid treated products which are probably loose salts of amides in most instances may be similarly substituted for the specific condensation products or acid treated products of the preceding examples. Other products prepared by reacting 1 mol of a higher fatty acid, preferably saturated, such as palmitic, stearic and arachidic, with ½ to 3 mols of alkoylol amine, and the after treated products with ¾ to 6 mols of the acids described above, may be similarly used.

The time and temperature of treatment may vary considerably depending upon the particular fabric and condensation product. Thus an instant up to 10 or 15 minutes represents a practical period. The temperature may be between 30° C. and lower, and about 100° C., the preferred range being 35° to 60° C.

This invention possesses the advantage that fibers, etc., which are so treated are more acceptable to the trade. They are softer than untreated fibers and smooth to the touch and fuller. When white or bleached fabrics are so treated no discoloration obtains. The shade and light fastness of dyed materials is unchanged, which is surprising. The treatment also reduces static charges. This is more apparent at higher concentrations of the condensation product, but is noticeable with lesser amounts. These advantages are especially noticeable with viscose rayon both of the lustrous and delustered type.

As many apparently widely different embodiments of the invention may be made without departing from the spirit and scope thereof it is to be understood that we do not limit ourselves to the specific embodiments thereof except as described in the following claims.

We claim:

1. The process which comprises softening cellulosic materials and artificial fibers in an aqueous bath containing from 0.001 to 0.05% by weight, of a condensation product of an alkylolamine and a member of the group consisting of higher fatty acids, their esters and anhydrides and acid halides, which has been after treated with an acid.

2. The process of claim 1 in which the acid used is a strong mineral acid.

3. The process of claim 1 in which the acid used for the after treatment is a strong organic acid.

4. The process which comprises treating cellulosic materials at a temperature between 30° and 100° C. in an aqueous bath containing from 0.001 to 0.05% by weight of a condensation product of 1 mol of a member of the group consisting of higher fatty acids, their esters and anhydrides and halides with ½ to 3 mols of an alkylolamine which has been after treated with a strong acid.

5. The process which comprises treating cellulosic materials at a temperature between 35 and 60° C. in an aqueous solution containing from 0.001% to 0.05% by weight of a condensation product of a higher saturated monocarboxylic acid with 1.1 to 1.75 mols of dialkylol amine which has been after treated with not more than 1 mol of hydrochloric acid.

6. The process of claim 5 wherein the cellulosic material is composed of viscose fibers taken from the class consisting of lustrous and delustered fibers.

7. A treating bath for cellulosic materials comprising an aqueous solution containing from 0.001 to 0.05% by weight of a condensation product of an alkylolamine and a member of the group consisting of higher fatty acids, their esters and anhydrides and acid halides, which has been after treated with an acid.

SAMUEL LENHER.
LUTHER B. ARNOLD, Jr.